July 17, 1951

W. N. MATSON ET AL 2,561,214

COMBINATION BALANCED SHUTOFF AND
THROTTLING VALVE ASSEMBLY

Filed July 26, 1950

2 Sheets-Sheet 1

Inventors:
William N. Matson,
Harry A. Mayor,
by Ernest C. Britton
Their Attorney.

July 17, 1951
W. N. MATSON ET AL
COMBINATION BALANCED SHUTOFF AND
THROTTLING VALVE ASSEMBLY
2,561,214
Filed July 28, 1950
2 Sheets-Sheet 2
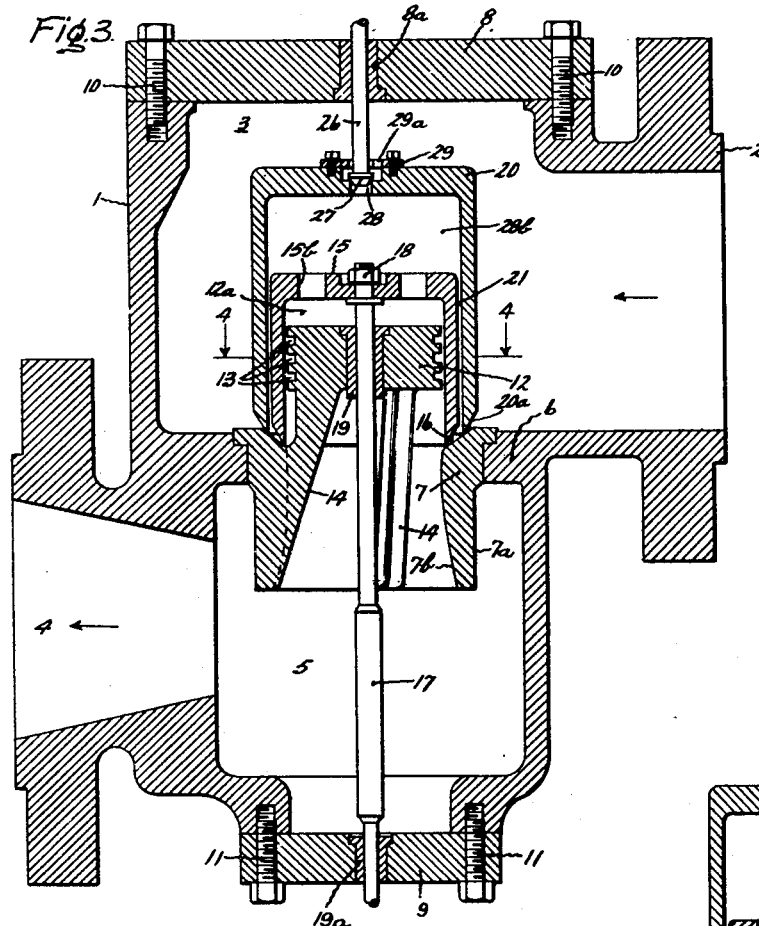
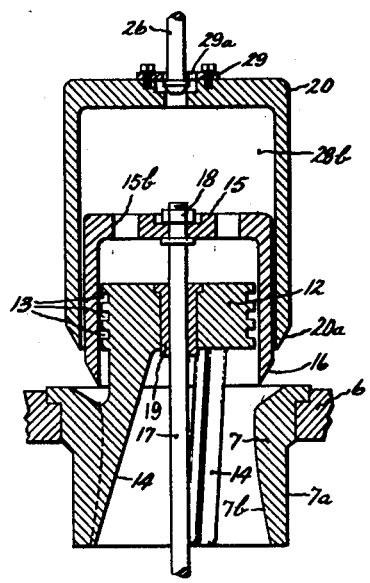
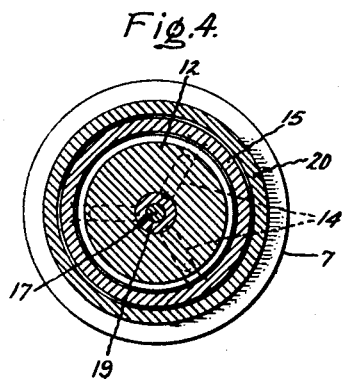
Inventors:
William N. Matson
Harry A. Mayor,
by Ernest C. Britton
Their Attorney.

Patented July 17, 1951

2,561,214

UNITED STATES PATENT OFFICE 2,561,214

COMBINATION BALANCED SHUTOFF AND THROTTLING VALVE ASSEMBLY

William N. Matson and Harry A. Mayor, Fitchburg, Mass., assignors to General Electric Company, a corporation of New York Application July 26, 1950, Serial No. 175,992

7 Claims. (Cl. 277—37)

This invention relates to an improved composite valve, particularly a balanced type of valve for regulating a fluid pressure prime mover such as a steam turbine. This valve is a particularly advantageous combination of a governing valve for a steam turbine combined with a shutoff valve.

The present structure is a further improvement of the general type of valve disclosed in patent 2,471,160, issued May 24, 1949 on an application of William N. Matson and Stephen Jacobs and assigned to the assignee of the present application.

The purpose of the present invention is to provide a more efficient and yet more compact dual valve capable of performing the same general functions as the combination turbine stop valve and throttling valve described in the above-mentioned patent.

Figure 1:
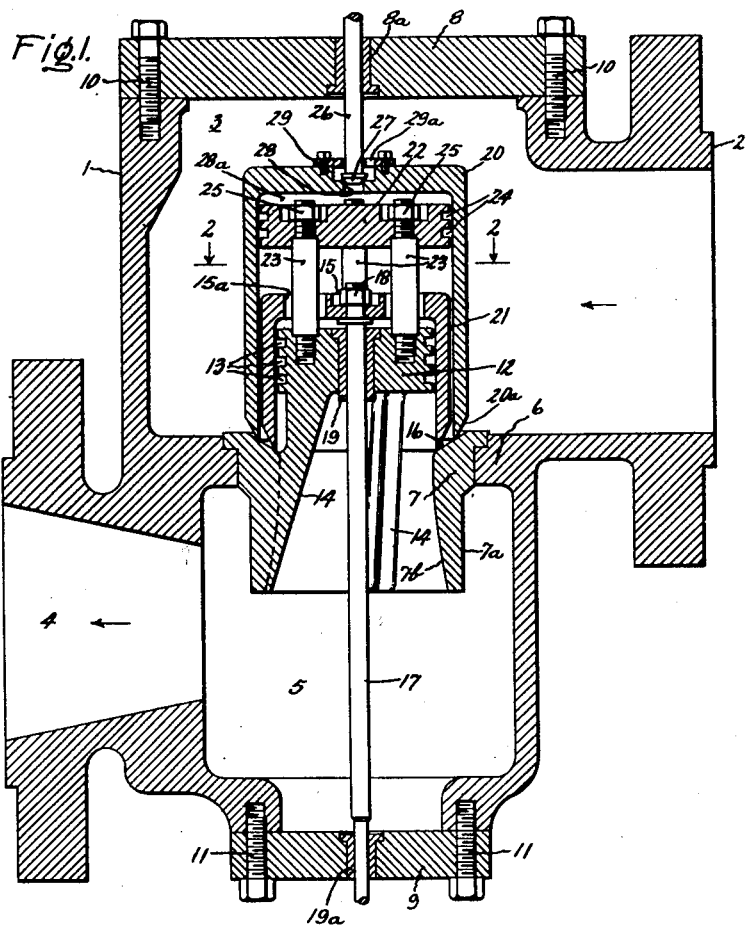
Figure 2:
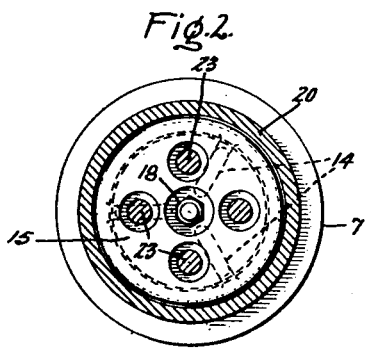

Other objects and advantages will be apparent from the following description taken in connection with the accompanying drawings, in which Fig. 1 is a sectional view of a dual valve arranged in accordance with the invention; Fig. 2 is a transverse section taken on the plane 2—2 in Fig. 1; Fig. 3 is a sectional view of a modified form of the invention; Fig. 4 is a transverse section on the plane 4—4 in Fig. 3; and Fig. 5 is a partial sectional view of the valve shown in Fig. 3 but illustrating the movable flow control members in open position.

Generally, the present improvement consists in arranging two flow controlling cup pistons in coaxial "nested" relation, both cooperating with a common valve seat portion of the housing. This arrangement makes a substantial saving in space, and at the same time improves the efficiency of the valve since the fluid experiences only one energy-losing contraction and re-expansion.

Referring now more particularly to Fig. 1, the valve assembly comprises a housing or body 1 having a flanged inlet 2 defining an inlet passage communicating with a first chamber 3, and a similar flanged outlet 4 defining a passage communicating with a second chamber 5. Separating the chambers 3, 5 is a wall 6 defining a circular opening in which is disposed a valve seat insert 7. Seat member 7 has a depending skirt portion 7a of substantial axial length and is secured in the wall 6 by any suitable means, such as a few tack-welds.

At either end of housing 1 is a circular opening closed by the respective head members 8, 9. These may be secured to the housing by suitable threaded fastenings 10, 11 in a manner which will be apparent from Fig. 1.

As in the above-mentioned patent, the flow control members consist of two cup-shaped piston members supported on a stationary guide piston member fixed to the valve seat insert member 7. As will be seen in Fig. 1, the single stationary guide piston 12 may be provided with conventional piston rings (not shown), or merely annular sealing grooves as shown at 13. Guide piston 12 is supported from valve insert 7 by radially extending ribs or webs 14, having lower end portions welded to or formed integral with the seat member 7.

The throttling or governing valve member consists of a first cup-shaped piston 15 having an inner cylindrical surface slidably disposed over the stationary guide piston 12. The circumferential edge portion of cup member 15 is beveled at a rather sharp acute angle, indicated at 16, so as to define a narrow annular land adapted to sealingly contact the valve seat member 7 in a manner which will be obvious from Fig. 1.

Cup piston 15 is arranged to be positioned by an actuating rod 17 secured to the piston by a nut 18, which locates the cup axially, but which has sufficient radial clearance, to allow slight adjustment so that the cup is guided by piston 12 without binding. Actuating rod 17 is slidably disposed through a central bushing 19 secured in piston 12. The remote end of rod 17 projects through another bushing 19a in the bottom plate member 9 and is positioned by a hydraulic motor or equivalent (not shown) as disclosed more particularly in Patent 2,471,160.

The shutoff flow control member comprises a second cup piston 20 disposed over the first piston 15 in telescopic relation, with a radial clearance at 21 on the order of .005 inch for a 4 inch diameter valve. In order to positively support and guide cup piston 20, a second stationary guide piston 22 is provided. This piston is supported from the first piston 12 by means of three or more stud members 23 threaded into the piston 12 and projecting freely through generously proportioned openings 15a in the first piston 15. The annular clearance spaces between holes 15a and studs 23 constitute pressure equalizing ports. It will be observed that piston 22 may be provided with sealing rings or grooves 24 similar to the above described grooves 13. Piston 22 is secured to the upper ends of the studs 23 by the retaining nuts 25 or the equivalent.

The second cup piston 20 is adapted to be moved to its fully open position by means of an actuating rod 26, which projects through a bushing 8a in the upper cover plate 8 and is adapted to be positioned by any suitable type of motor means (not shown), for instance the manual and automatically actuated mechanism shown in the Matson et al. Patent 2,471,160.

Actuating rod 26 is not positively secured to piston 20, but engages it with a lost-motion connection in the form of a pilot valve disk member 27 adapted to engage an annular valve seat surrounding a port 28 centrally disposed in the piston 20. When actuating rod 26 rises, the disk 27 first opens the pressure balancing port 28 and subsequently engages a retaining disk 29, which has radially inwardly projecting fingers 29a, after which further upward movement of actuating rod 26 causes the cup piston 20 to rise. It will be understood that when cup piston 20 is in open position, the spaces between the projecting fingers 29a provide free communication between the inlet chamber 3 and the chamber 28a defined between cup piston 20 and the second guide piston 22. Thus there is substantially no pressure difference across the cup piston 20, so that the force required to position it is minimized.

The method of operation of this valve assembly will now be apparent. When used in connection with a steam turbine, the rod 17 will be actuated to move the governing valve cup member 15 upwardly so as to define an annular orifice with the valve seat member 7. The second rod 26 is then raised so that pressure fluid from the inlet chamber 3 passes the pilot valve disk 7 into the space 28a so that comparatively little force is required to position the cup piston 20. This will ordinarily be effected by manual means while the turbine is being brought up to normal operating speed, at which time automatic governing mechanism (not shown) takes over control by positioning the governing valve stem 17. With the governor in control, the manual mechanism is actuated to raise the shutoff piston member 20 to extreme upper position, in which position it remains during normal operation of the turbine, further control being effected by the governing valve cup member 15. In the event of an emergency, other governing mechanism is provided to cause the piston rod 26 to descend and close the cup piston 20. This may also be accomplished manually when it is desired to shut down the turbine.

It will be understood that the shutoff valve piston 20 is ordinarily in wide open position, while the governing valve piston 15 defines an annular throttling orifice of varying size with the valve seat insert member 7. It will be apparent that with this arrangement the motive fluid suffers only one throttling process in passing through the control valve assembly, with the result that losses due to eddying and re-expansion of the fluid down-stream from the throttling orifice are reduced. To this end, the passage through the valve seat insert member 7 is formed in axially elongated skirt portion 7a and the inner wall surface 7b is smoothly finished and curved so as to form a carefully proportioned venturi for best passage of flow with least loss of pressure energy.

To provide friction-free operation and freedom from sticking or "galling," the cylindrical surfaces of the first piston 15 and the inner circumferential surface of the second piston 20 may be suitably hardened, as by a "nitriding" process, and then carefully ground. The outer piston 20 is guided at two places, on the stationary piston 22 and on the outer surface of the first piston 15. This is of course made desirable by the loose connection between the piston 20 and its actuating rod 26. This arrangement employing the auxiliary stationary guide piston 22 is particularly advantageous in large capacity valves where the length of travel of the outer piston 20 is large.

It will be apparent that ready access may be had to the flow controlling pistons, by simply removing the upper head member 8. The first piston 20 may be then withdrawn, the stationary guide piston 22 removed by loosening the nuts 25, after which the retaining nut 18 may be taken off and the second piston 15 withdrawn from the other stationary guide piston 12. Thus all essential parts of the valve are readily accessible by removing only one cover plate.

The modified form of this improved valve assembly shown in Fig. 3 is somewhat simpler and therefore cheaper to manufacture, yet effective where the travel of the outer piston member is not as great as that permitted with the construction of Fig. 1. This simplification is effected by omitting the second stationary guide piston 22 and the supporting studs 23. With this arrangement it will be obvious that the piston is guided entirely by contact with the outer cylindrical surface of the inner piston 15, the radial clearance between inner and outer pistons being as indicated above in connection with Fig. 1. In addition to being positively guided by the inner piston, the cup piston 20 will tend to be centered by the fluid forces acting on it.

Except for elimination of the second guide piston, the construction of the valve assembly shown in Fig. 3 is similar to that of Fig. 1.

It will be observed that the comparatively long valve actuating rod 17 is positively guided at its upper end by the bushing 19 and at its lower end by the bushing 19a. Thus the rod may be made of comparatively small diameter so as to reduce any unbalanced pressure force on the piston 15 corresponding to the effective cross-section area of rod 17, which effective area is of course exposed to atmospheric pressure at its bottom end and to steam inlet pressure at its upper end when shutoff piston 20 is in open position.

Fig. 5 illustrates the valve of Fig. 3 with the flow control pistons in normal operating position. It will be seen that the outer piston 20 is in fully open position, while the governing valve piston 15 is in an intermediate position corresponding to partial load operation of the turbine. It will be observed here that the beveled outer end surface 16 of the inner piston 15 forms a contracting annular passage with adjacent surfaces of the Venturi surface 7b, while the similarly beveled surface 20a of the outer piston helps to define a smoothly contracting approach to the annular throttling orifice defined by surface 16. This effect is of course also produced with the valve arrangement of Fig. 1. Thus it will be seen that, with the shutoff cup piston member 20 in normally wide open position, a single substantially smoothly contracting annular orifice is provided for all positions of the governing cup piston 15. Thus smooth flow is effected through the Venturi passage 7b with only a single throttling process to produce energy losses. This improvement in the energy losses occasioned by the flow of motive fluid through the valve assembly is substantial, the losses being only on the order of 50% of that which occurs if two throttling processes in series are experienced by the fluid, as ordinarily happens where a separate shut-off and governing valve are provided with a short length of conduit between.

As indicated above in connection with Fig. 1, the port 28 serves to equalize the pressure differential across cup piston 22, to minimize the operating force which must be applied. Similarly, the clearance spaces defined by ports 15a (Fig. 1) serve to equalize the differential across piston 15. In the modification of Fig. 3, ports 15b are provided in piston 15 so that the initial pressure in chamber 3 is communicated to space 28b between the two cup pistons, and to the space 12a between cup piston 15 and guide piston 12.

In addition to the improved efficiency of this valve assembly, the simplicity of the construction results in appreciable savings in cost of the castings required, the whole assembly being enough smaller than the arrangement of U. S. Patent 2,471,160 to effect a substantial saving in overall space requirements.

While only two specific embodiments of the invention have been described, it will be obvious to those skilled in the art that many changes in mechanical structure might be effected, and it is desired to cover by the appended claims all such changes and modifications as fall within the true spirit and scope of the invention.

What we claim as new and desire to secure by Letters Patent of the United States is:

1. In a composite valve, the combination of a valve body with walls defining a first chamber and a second chamber separated by a wall portion defining a Venturi shaped passage of substantial length, a stationary guide piston member supported from said wall portion in fixed coaxial relation with the Venturi passage and spaced axially therefrom in the first chamber, a first movable cup-shaped piston member slidably disposed over said guide piston and having a circumferential edge portion adapted to sealingly engage the inlet portion of the Venturi passage in one extreme position, the guide piston defining a central axial bore, a first actuting rod slidably disposed in said bore and having one end portion connected to the first cup piston and another end portion extending through the second chamber and a wall thereof whereby the first cup piston may be variably positioned on the guide piston so the edge of the cup forms an annular throttling orifice with the adjacent wall of the Venturi passage, a second movable cup piston slidably disposed over the first cup in the first chamber and also having a circumferential edge portion adapted to sealingly engage a portion of the Venturi passage wall immediately surrounding that contacted by the first cup, a second actuating rod connected to the second cup and slidably disposed through an adjacent wall portion of the first chamber, the circumferential edge of each cup piston being beveled to provide a narrow annular contact surface, whereby, when the second cup piston is in wide open position, the two pistons cooperate with the adjacent walls of the Venturi passage to form a single substantially smooth contracting annular orifice discharging into the throat portion of the Venturi passage.

2. In a composite valve assembly, the combination of a valve body defining a first chamber and a second chamber separated by a wall portion forming a Venturi-shaped passage, a stationary guide piston member supported from said wall portion in fixed coaxial relation with the Venturi passage and spaced axially therefrom in the first chamber, a first movable cup-shaped piston member slidably disposed over said guide piston and having a circumferential edge portion adapted to sealingly engage the inlet portion of the Venturi passage, a first actuating rod slidably disposed through a central bore in said guide piston and having one end portion connected to the first cup piston and the other end portion extending through the second chamber and a wall portion thereof whereby the first cup may be variably positioned on the guide piston so the edge of the cup forms an annular throttling orifice with the adjacent wall of the venturi, a second movable cup slidably disposed over the first cup in the first chamber and also having a circumferential edge portion adapted to sealingly engage a portion of the Venturi wall immediately surrounding that contacted by the first cup, a second actuating rod connected to the second cup and slidably disposed through an adjacent wall portion of the first chamber, whereby one of said cup pistons may be moved to wide open position, serving as a shut-off valve, while the other is variably positioned to form an annular throttling orifice for discharging fluid from the first chamber into the Venturi passage by a single throttling process.

3. A composite valve assembly in accordance with claim 2 having a lost motion connection between the outer cup piston and its actuating rod, said lost motion connection including a pilot valve disk member connected to move with the rod and adapted to cooperate with a pressure balancing port in the piston, whereby the fluid pressure in the first chamber becomes substantially equalized with that in the space within the outer piston when the actuating rod disengages the pilot valve disk member from said pressure balancing port in moving the outer cup piston to open position.

4. A composite valve assembly in accordance with claim 2 and including pressure balancing ports in the inner cup piston for equalizing the fluid pressure thereacross, whereby the force required to position the inner cup piston is reduced to a minimum.

5. In a composite valve assembly, the combination of a valve body having a first chamber and a second chamber separated by a wall portion defining a Venturi shaped passage, a first stationary guide piston supported from said wall portion in fixed coaxial relation with the venturi and spaced axially therefrom in the first chamber, a first movable cup-shaped piston member slidably disposed over said first guide piston and having a circumferential edge portion adapted to sealingly engage the inlet portion of the venturi, a first actuating rod slidably disposed in a central bore through said first guide piston and having one end portion connected to the first cup piston and a second end portion extending through the second chamber and a wall portion thereof whereby the first cup may be variably positioned on the first guide piston so the edge of the cup forms an annular throttling orifice with the adjacent wall of the venturi, a second stationary guide piston disposed in said first chamber coaxial with and spaced axially away from the first guide piston, support means connected to said first and second guide pistons extending freely in an axial direction through at least one opening in the first cup piston member, a second movable cup piston slidably disposed over the second stationary guide piston and surrounding the first cup piston with a circumferential edge portion adapted to sealingly engage a portion of the Venturi passage wall surrounding that contacted by the first cup, a second actuating rod connected to the second cup and slidably disposed through an adjacent wall portion of the first chamber, the comparatively shorter inner cup piston being guided on the first stationary piston while the second cup piston is guided both by engagement with the second stationary piston and the outer surface of the first cup piston.

6. In a composite valve assembly, the combination of a valve body defining a first chamber and a second chamber separated by a wall portion forming a Venturi-shaped passage, a first stationary guide piston supported from said wall portion in fixed coaxial relation with the Venturi passage and spaced axially therefrom in the first chamber, a first movable cup-shaped piston member slidably disposed over said guide piston and having a beveled circumferential edge portion adapted to sealingly engage the inlet portion of the venturi, a first actuating rod slidably disposed through a central bore in said guide piston and having one end portion connected to the first cup piston and the other end portion extending through the second chamber and the wall portion thereof whereby the first cup may be variably positioned on the guide piston so the edge of the cup forms an annular throttling orifice with the adjacent wall of the venturi, a second stationary guide piston disposed in the first chamber coaxial with and spaced axially away from the first guide piston, support means connected to said first and second guide pistons and extending freely in an axial direction through at least one opening in the first cup piston member, the clearance space between said support means and the opening in the first cup forming a pressure-balancing port, a second movable cup piston slidably disposed over the second stationary guide piston and surrounding the first cup piston with a beveled circumferential edge portion adapted to sealingly engage a portion of the Venturi passage immediately surrounding that contacted by the first cup, a second actuating rod slidably disposed through a wall portion of the first chamber, means connecting said second actuating rod with the second cup piston and including a lost motion connection comprising a pilot valve disk member connected to move with the rod and adapted to cooperate with a pressure-balancing port in the second cup piston, movement of the second actuating rod in the opening direction serving to open the pilot valve and permit pressure fluid from the first chamber to communicate with the space defined within the second cup piston and the second stationary guide piston.

7. In a composite valve assembly, the combination of a valve body defining an inlet chamber and an outlet chamber separated by a wall portion forming a circular flow control port, a stationary guide piston member supported from said wall portion in fixed coaxial relation with the port and spaced axially therefrom in the inlet chamber, a first longitudinally slidable cup-shaped piston member disposed over the stationary guide piston and having a circumferential edge adapted to engage said wall portion around the port, a first actuating rod slidably disposed through a bore in said guide piston and having one end portion connected to the first cup piston and the other end portion projecting through the outlet chamber and adapted to be variably positioned so the edge of the cup piston forms an annular orifice with the wall portion surrounding said port, a second longitudinally slidable cup piston member disposed over the first cup in the inlet chamber and also having a circumferential edge portion adapted to engage said wall portion surrounding that contacted by the first cup piston, a second actuating rod connected to the second cup and extending through an adjacent wall portion of the inlet chamber, whereby one of said cup pistons may be moved to a wide open position, serving as a shut-off valve, while the other is variably positioned to form an annular throttling orifice for discharging fluid from the inlet chamber through the port into the outlet chamber with only a single throttling process.

WILLIAM N. MATSON.
HARRY A. MAYOR.

REFERENCES CITED

The following references are of record in the file of this patent:

UNITED STATES PATENTS

| Number | Name | Date |
|---|---|---|
| 712,009 | Schutte | Oct. 28, 1902 |
| 1,956,987 | Hose | May 1, 1934 |
| 2,471,160 | Matson | May 24, 1949 |